H. G. GILLMOR.
BOLT AND NUT FASTENING.
APPLICATION FILED SEPT. 2, 1905.
993,676.
Patented May 30, 1911.
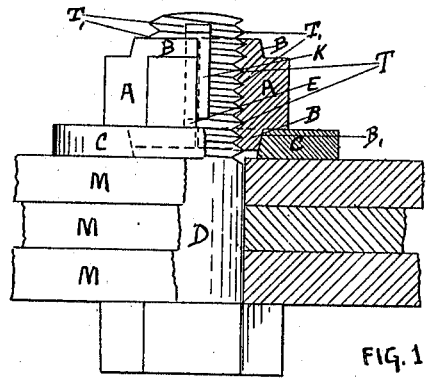
FIG. 1.
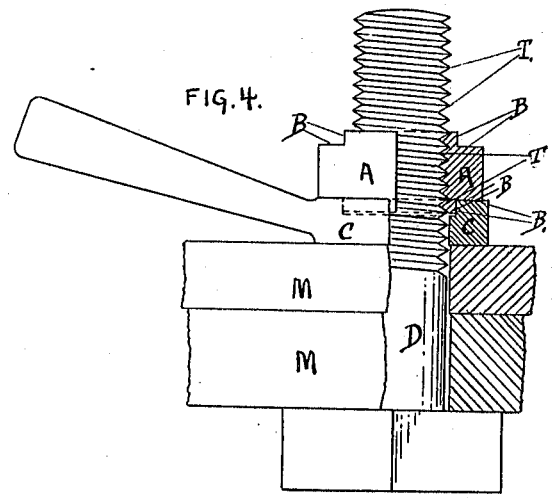
FIG. 4.
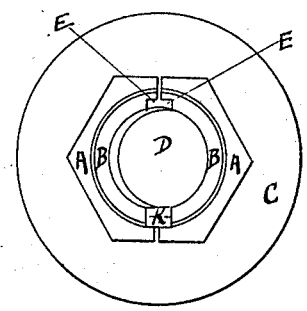
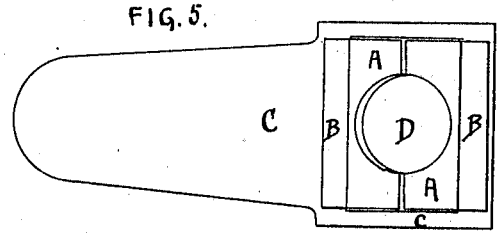
FIG. 5.
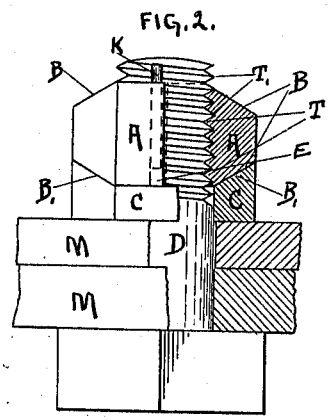
FIG. 2.
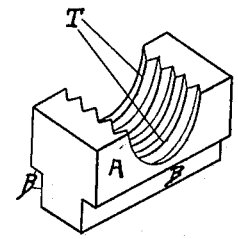
FIG. 6.
FIG. 7.
FIG. 3.
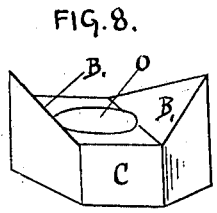
FIG. 8.
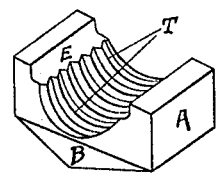
FIG. 9.
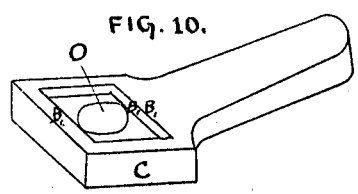
FIG. 10.
Witnesses
H. H. Bornemont.
H. E. Williams.
H. G. Gillmor
Inventor
THE NORRIS PETERS CO., WASHINGTON, D. C.

UNITED STATES PATENT OFFICE.

HORATIO G. GILLMOR, OF BATH, MAINE.

BOLT AND NUT FASTENING.

993,676.         Specification of Letters Patent.    Patented May 30, 1911.

Application filed September 2, 1905. Serial No. 276,870.

*To all whom it may concern:*

Be it known that I, HORATIO G. GILLMOR, a citizen of the United States, residing at Bath, in the county of Sagadahoc, in the State of Maine, have invented a new and useful Bolt and Nut Fastening, of which the following is a specification.

The object of my invention is to so construct the nuts used with bolt that they may be more cheaply and rapidly produced, the nuts more quickly applied and so locked when screwed up as to prevent the fastening from loosening. These objects I attain in the following manner, reference being had to the accompanying drawings in which—

Figures 1 and 2 are, respectively, a side view, partly in section, and a plan view of the bolt, nut and washer, illustrating my improved fastening. Fig. 3 is a side view, partly in section, illustrating a modified form of my improved fastening. Figs. 4 and 5 are, respectively, a side view, partly in section, and a plan view, illustrating another modified form of my improved fastening adapted to the rapid temporary securing of structural or other materials. Fig. 6 is a perspective view of the nut segment used in the form of my invention illustrated in Figs. 1 and 2. Figs. 7 and 10 are, respectively, perspective views of the nut segment and the locking chair used in the modified form of my invention illustrated in Figs. 4 and 5. Figs. 8 and 9 are, respectively, perspective views of the locking chair and nut segment used in the modified form of my improved fastening illustrated in Fig. 3.

Similar letters refer to similar parts throughout the several views.

"A, A," etc., are nut segments having segmental female threads "T, T," etc.

"D, D," etc., are bolts having corresponding male threads "$T_1$, $T_1$," etc., adapted to engage with the segmental threads "T, T," of the nut segments.

"C, C," etc., are washers or chairs having apertures "O," permitting them to be traversed by the bolt and surfaces "$B_1$, $B_1$," etc., so arranged that, when the nut segments are in place with their threads "T, T," etc., engaging in the usual way the threads "$T_1$, $T_1$," etc., of the bolts, they engage with surfaces "B, B," etc., of the nut segments, and hold the nut segments in place with their threads in engagement with the threads of the bolt.

"E, E," etc., are recesses or apertures formed in the nut segments to receive keys "K, K," etc., of any form to prevent movement of the nut segments with reference to the bolt.

With the usual form of nut in one piece it is necessary to apply the nut by starting the thread of the nut and then revolving the nut about the bolt axis until the head of the bolt and a face of the nut are brought into contact with the materials to be secured by the fastening. With threads of the form usually employed, the stress upon the threads as the nut is tightened to draw the materials together may be considered as made up of two components, one parallel to the axis of the bolt and one at right angles to this axis. These latter forces tend to tear the nut apart along a diametral plane; and, were it formed in segments, would, by forcing the segments apart, disengage the threads of the nut from those of the bolt.

In my invention the nut is made up of segments; and, to take these side stresses tending to disengage the threads as the nut is set up; the segments are so formed that they interlock with the washer or locking chair employed with them, in such a manner that these side stresses are taken by the washers or locking chair and the segments retained in place with their threads in engagement with the threads of the bolt. To accomplish this the nut segments may be given a great variety of forms, three of which have been illustrated in the drawings. When it is desired that the nut segments shall be employed with washers, as in Fig. 1; they are formed with shoulders which will have locking contact with the washer upon the conical or cylindrical surfaces bounding the opening in the washer, so as to permit the nut to turn independently of the washer, while held with the threads in proper engagement with the threads of the bolt; so permitting the washer to perform its customary purpose, in reducing friction and increasing bearing surface, while performing its important service of retaining the nut segments with their threads in engagement with the threads of the bolt. When it is desired to lock the nut segments by means of an element (which I have designated for purposes of description as a locking chair) moving with and virtually forming part of a composite nut; the nut segment and locking chair may be given a great variety of forms (two of which Figs. 3, 4 and 5 illustrate); it being only necessary that the side stresses tending to force the threads of the bolt and nut segments out of engagement be transmitted to and taken by the locking chair so that the nut segments are held in place to do their work.

It is obvious that a single nut segment, with a suitably formed locking washer or chair, might be employed, in connection with a bolt, as a fastening. Generally, however, it is preferred to use a greater portion of the circumference of the bolt and it is a feature of my invention that the fastening is made of segments, preferably two in number, which are exact duplicates of and absolutely interchangeable with one another so that any two segments taken at random from the segments of any one size and form may, with a suitable locking chain or washer, be employed for the fastening. I attain this by making the segmental female threads of the half nuts absolutely symmetrical about the plane through the half nuts at mid height so that any half nut may be reversed in position upon a bolt without change in the lateral position of its end surfaces with respect to the axis of the bolt, and by forming the two ends of the half nuts with surfaces, symmetrical about this same plane, either of which will engage with the locking chair or washer to retain the half nuts in position with their threads engaging with the threads of the bolts. Half nuts constructed in accordance with this invention will each for any size and form, be exactly the duplicate of every other not only as to form and size but as to the exact location and aspect of the segmental threads with respect to the end surfaces and any two half nuts taken at random when placed opposite one another in engagement with the same threads of a bolt will have their end surfaces in correspondence so that they will engage with the locking chair or washer with the plane face of the chair or washer perpendicular to the axis of the bolt. This construction permits the half nuts to be manufactured in quantity for distribution and any two such duplicate half nuts with a suitable locking washer applied to a bolt makes an efficient fastening.

In the use of bolts and nuts of ordinary form the tendency of the nuts to work loose is a fruitful source of trouble. In my invention I overcame this by forming the nut segments with a recess or recesses as shown at "E" in the drawings; into which, when the composite nut has been set up to any desired degree of tightness, a key "K" may be driven to prevent the relative movement of the nut and bolt which would loosen the fastening. These recesses may be made of any form to suit the form of key which it is desired to employ and may be located in the position shown in the drawings or at any other position. Generally, pins of rectangular or circular sections would be employed for keys; but the keys may be given any desired form. Generally, no special preparation of the bolt to receive the key will be necessary. The driving of the key will flatten slightly or cut into the threads of the bolt to form a seating which will hold the key and nut sufficiently to prevent the movement of the nut. When it is desired, however, to provide for more or less frequent removal of the nut; the bolt may be flattened or provided with a key seat of any form; and the degree of adjustment of tightness of the nut and bolt secured by providing a number of recesses in the nut segments into any one of which, when opposite the key seat on the bolt, the key may be driven.

To apply my invention the bolt, "D", is passed through the openings in the materials, "M, M," to be secured and the opening, "O", in the washer or locking chair, "C". One or more nut segments, "A", are then placed with their segmental threads, "T, T," in engagement with the corresponding threads of the bolt, "$T_1$, $T_1$," as close to the washer or chair, "C", as convenient. When, as will generally be the case, two segments are used, one will be placed in a position inverted with respect to the other, as described above. By screwing up on the nut until, "B", engages with the washer, "C", as shown in Fig. 1, or by drawing up the locking chair, "C", until its surfaces, "$B_1$, $B_1$," engage with the surfaces, "B, B," of the nut segments, as illustrated in Figs. 3 and 4, the segments are locked in position on the bolt; and the composite fastening so formed may be tightened to any desired degree by screwing up on the nut in the usual manner.

While my invention is applicable to any of the purposes for which bolts and nuts of ordinary form are employed; it presents special advantages when rapid application of nuts without the necessity of screwing on for a considerable length of bolt is desired. This is the case in temporarily securing structural materials for shipbuilding, bridges, steel buildings, etc.; where, on account of the varying thicknesses of material, it is customary to supply temporary bolts of ample length for any combination of thicknesses. Figs. 4 and 5 illustrate an application of my invention to such work, and it will be readily seen that the nut may be so applied that but one or two turns only will be necessary to bring it into contact with the materials. In this application of my invention, the locking chair may be formed with an arm as shown in Figs. 4, 5 and 10, so that the nut may be set up or loosened by striking the arm with a hammer.

Having described my invention, what I claim and desire to secure by Letters Patent is:

1. A reversible half nut constructed with segmental female threads adapted to engage with the male threads of a bolt and like end surfaces, symmetrical about the plane at mid height of said half nut, adapted automatically to engage with suitable surfaces of a locking member, to retain the threads of said half nut in engagement with the threads of a bolt under stress in the direction of the axis of the threads upon said half nut, substantially as described.

2. A fastening, including in combination two like reversible half nuts having segmental female threads held in engagement with the thread of a bolt by the automatic engagement of like end surfaces of said half nuts with suitable surfaces of a locking member under the end pressure produced by screwing said nut upon a bolt, substantially as described.

3. A nut including in combination with a locking chair a reversible nut segment having segmental female threads symmetrically disposed about the plane at mid height of said nut segment, and having suitably formed end surfaces, symmetrically disposed about said plane at mid height, either of which is adapted to engage with said locking chair in such manner as to retain the threads of said nut segment in engagement with the threads of a bolt, substantially as described.

4. A nut comprising a locking chair and nut segments each having segmental female threads adapted to engage with corresponding male threads of a bolt and end surfaces adapted automatically to so engage with suitable surfaces of the locking chair when said nut segments are turned upon a bolt as to retain the threads of said nut segments in engagement with the threads of a bolt, substantially as described.

5. A nut comprising reversible nut segments, each having segmental female threads adapted to engage with corresponding male threads of a bolt and surfaces, symmetrically disposed about a plane at right angles to the axis of the said threads, adapted to engage with suitably formed surfaces of a locking chair; and a locking chair engaging with suitably formed surfaces of the said nut segments in such manner as to retain the threads of the nut segments and bolt in engagement; for substantially the purposes set forth.

6. A nut including in combination with a locking washer, two substantially like, reversible, half nuts, each having segmental female threads adapted to engage with corresponding male threads of a bolt and shoulders, symmetrically disposed about a plane at mid height of said nut segments at right angles to the axes of the threads thereof, adapted to engage with said locking washer in such manner as to retain the threads of said half nuts in engagement with the threads of a bolt, substantially as described.

7. A fastening comprising a bolt having male threads; nut segments, each having segmental female threads adapted to engage with the threads of the said bolt and approximately plain surfaces approximately parallel to the axis of the bolt, to which a wrench for turning the nut upon the said bolt may be applied; a locking chair traversed by the body of the bolt and engaging with suitably formed surfaces of the nut segments in such manner as to retain the threads of the nut segments and threads of the bolt in engagement; and a key engaging with the said bolt and one or more of the said nut segments in such manner as to prevent movement of the nut with respect to the bolt; for substantially the purposes set forth.

8. A fastening comprising a bolt, nut segments each having segmental female threads adapted to engage with the threads of said bolt, a washer engaging said nut segments in such manner as to retain the threads of said bolt and nut segments in engagement and means to prevent said nut segments from turning upon said bolt for substantially the purposes set forth.

9. A fastening comprising a bolt having male threads; reversible nut segments, each having segmental female threads adapted to engage with the threads of the said bolt and surfaces, symmetrically disposed about a plane at right angles to the axis of the said threads, adapted to engage with suitably formed surfaces of a locking chair; and a locking chair traversed by the body of the bolt engaging with suitably formed surfaces of the nut segments in such manner as to retain the threads of the nut segments and the threads of the bolt in engagement; for substantially the purposes set forth.

10. A fastening including a bolt having male threads, a washer traversed by the body of the bolt and reversible nut segments, each having segmental female threads adapted to engage with the threads of said bolt and having shoulders at the ends thereof symmetrically disposed about the plane at mid height at right angles to the axis of the threads of said nut segments, adapted to engage with said washer in such manner as to retain the threads of the nut segments in engagement with the threads of the bolt.

11. A fastening comprising a bolt having male threads; two, substantially like half nuts each having segmental female threads adapted to engage with the threads of the said bolt and surfaces, symmetrically disposed about a plane at right angles to the axis of the said segmental threads, adapted to engage with suitably formed surfaces of a locking chair; and a locking chair traversed by the body of the bolt and engaging with suitably formed surfaces of the nuts in such manner as to retain the threads of the said half nuts and the threads of the bolt in engagement; for substantially the purposes set forth.

12. A fastening comprising a bolt having male threads; two, substantially like, reversible, half nuts, each having segmental female threads adapted to engage with the threads of the said bolt and surfaces, symmetrically disposed about a plane at right angles to the axis of the said threads, adapted to engage with suitably formed surfaces of a locking chair; a locking chair traversed by the body of the bolt and engaging with suitably formed surfaces of the said half nuts in such manner as to retain the threads of the half nuts and the threads of the bolt in engagement; and a key engaging with the bolt and one or both of the said half nuts in such manner as to prevent movement of the nut upon the bolt; for substantially the purposes set forth.

13. A fastening including in combination with a bolt having male threads, a washer traversed by the body of said bolt and two substantially like, reversible half nuts, each constructed with segmental female threads adapted to engage with the male threads of said bolt and shoulders symmetrically disposed about the mid height plane at right angles to the axis of the threads of said half nuts, adapted to engage with said washer in such manner as to retain the threads of the half nuts in engagement with the threads of the bolt.

14. A fastening comprising a bolt having male threads; two, substantially like, reversible, half nuts, each having segmental female threads adapted to engage with the threads of the said bolt and shoulders, symmetrically disposed about a plane at right angles to the axis of the said threads; a washer or locking chair traversed by the body of the bolt and engaging with shoulders of the said half nuts in such manner as to retain the threads of the half nuts and the threads of the bolt in engagement; and a key engaging with the bolt and one or both of the half nuts in such manner as to prevent movement of the nut upon the bolt; for substantially the purposes set forth.

In testimony whereof I have signed my name to this specification in the presence of two subscribing witnesses.

H. G. GILLMOR.

Witnesses:
   H. H. BONNEMORT,
   H. E. WILLIAMS.